(12) United States Patent
Ueyanagi et al.

(10) Patent No.: US 7,544,922 B2
(45) Date of Patent: Jun. 9, 2009

(54) NEAR-FIELD LIGHT-EMITTING ELEMENT AND OPTICAL HEAD

(75) Inventors: Kiichi Ueyanagi, Kanagawa (JP); Masayuki Naya, Kanagawa (JP); Yuichi Tomaru, Kanagawa (JP)

(73) Assignees: Fuji Xerox Co., Ltd., Tokyo (JP); Fuji Photo Film Co., Ltd., Minamiashigara-shi (JP)

( * ) Notice: Subject to any disclaimer, the term of this patent is extended or adjusted under 35 U.S.C. 154(b) by 893 days.

(21) Appl. No.: 11/185,868

(22) Filed: Jul. 21, 2005

(65) Prior Publication Data

US 2006/0018211 A1 Jan. 26, 2006

(30) Foreign Application Priority Data

Jul. 23, 2004 (JP) .............................. 2004-216210

(51) Int. Cl.
  G02F 1/03 (2006.01)
  G09G 3/36 (2006.01)
(52) U.S. Cl. .................... 250/216; 369/118; 369/44.23; 359/245
(58) Field of Classification Search ............. 369/44.23, 369/44.11, 112.23, 118; 359/15, 19, 355, 359/360, 566, 569, 571, 572, 574, 722, 723, 359/726, 733, 738, 739, 740; 250/216
See application file for complete search history.

(56) References Cited

U.S. PATENT DOCUMENTS 6,040,936 A * 3/2000 Kim et al. ................... 359/245
6,614,742 B2 * 9/2003 Ueyanagi ..................... 369/118
7,057,151 B2 * 6/2006 Lezec et al. .................. 250/216
7,417,219 B2 * 8/2008 Catrysse et al. ............. 250/234

FOREIGN PATENT DOCUMENTS

JP 2004-070288 A 3/2004

OTHER PUBLICATIONS

H. A. Bethe, The Physical Review, "Theory of Diffraction by Small Holes," Second Series, vol. 66, Nos. 7 and 8, pp. 163-182, 1944.
Correction of Proceedings 3, Spring Joint Lecture related to the Japan Society of Applied Physics 2004, 29p-D-10, p. 1139 This reference recites that the greater the periodicity, the higher the rate of enhancement and that the rate of enhancement is increased as the cross-sectional profiles of corrugations are closer to rectangular shape.

* cited by examiner

Primary Examiner—Georgia Y Epps
Assistant Examiner—Tony Ko
(74) Attorney, Agent, or Firm—Oliff & Berridge, PLC

(57) ABSTRACT

A near-field light-emitting element includes a transparent medium having a plane of incidence into which a laser beam enters, and a light-condensing plane on which the laser beam having entered the plane of incidence is concentrated, and a metal body provided on the light-condensing plane of the transparent medium having a first surface contacting the light-condensing plane, a second surface opposing the first surface, and an aperture which is formed to penetrate through the first and second surfaces at a position where the laser beam is concentrated and which emits a near-field light obtained from the laser beam. The metal body is arranged apart from a center of the aperture by a predetermined distance to connect together the first and second surfaces, and has a plasmon reflection plane that reflects toward the aperture a surface plasmon excited on the first and second surfaces by the laser beam concentrated at the aperture.

19 Claims, 10 Drawing Sheets

NEAR-FIELD LIGHT-EMITTING ELEMENT AND OPTICAL HEAD

BACKGROUND OF THE INVENTION

1. Field of the Invention

The present invention relates to an element which emits a enhanced near-field light, as well as to an optical head applying the element.

2. Description of the Related Art

In a related-art optical disk drive and a related-art optical lithography system, respectively, recording density and the width of a pattern are limited by the size of a light spot to be used and the limit is the order of the wavelength of the laser light to be used because it is impossible to reduce the spot size to less than the wavelength in the case of far-field concentration used in these devises.

Near-field light which emitted through a minute aperture formed in a metal film has recently drew much attention as means for producing a minute light spot exceeding the limit. In the case of the near-field light, since the spot size of the light is limited by the size of the aperture only, reducing the aperture size can reduce the spot size far less than the diffraction limit.

However, in the case of a simple aperture, the intensity of emitted near-field light is known to decrease in proportion to the fourth power of a ratio of the aperture to the wavelength (see, e.g., H. A. Bethe, Theory of Diffraction by Small Holes, Physical Review, Second Series, Vol. 66, pp. 163 to 182 (1944)).

As the means of breaking through the limit and enhancing the intensity of the near-field light, the excitation of surface plasmon by irradiating a laser beam on a metal film is promising.

Namely, the field intensity of light around the aperture is enhanced by interacting irradiated laser beam to the surface plasmon resonantly, whereby the intensity of the near-field light emitted through the aperture is also enhanced. A structure for periodically forming corrugations concentrically in a metal film around the aperture has been proposed as the means of interacting the irradiated laser beam to the surface plasmon efficiently (see JP-A-2004-70288).

FIGS. 11A and 11B show a near-field light-emitting element described in JP-A-2004-70288. As shown in FIG. 11A, the near-field light-emitting element is a rectangular metal film 10 formed on a transparent medium 6. The metal film 10 has a flat first surface 10a contacting the transparent medium 6, a second surface 10b opposing the first surface 10a, an aperture 10d formed so as to penetrate through the first to the second surfaces 10a, 10b, and plural ring-shaped recessed sections 10e formed periodically in the second surface 10b around the aperture 10d.

Here, the recessed sections 10e will be described in detail. The periodicity P of the recessed sections 10e is determined such that the product of the periodicity "P" and the refractive index "n" of the transparent medium 6 becomes slightly smaller than the maximum wavelength λ of the laser beam propagating through the metal film 10. The width of the recessed section 10e is made smaller than the periodicity P. The width of the actual corrugated pattern is set to 0.1 to 0.6 µm, and the periodicity of the same is set to 0.4 to 2 µm. In an optimal case, the intensity of near-field light 4e emitted from the aperture 10d is reported to have been enhanced by a factor of several hundreds times of that achieved in a case of no periodic pattern. It is also reported that the greater the periodicity, the higher the rate of enhancement and that the rate of enhancement is increased as the cross-sectional profiles of corrugations are closer to rectangular in shape (see Collection of Proceedings 3, Spring Joint Lecture related to the Japan Society of Applied Physics 2004, 29p-D-10, p-1139).

However, according to the related-art near-field light-emitting element, a corrugated pattern must be formed in advance in a transparent medium in order to form a periodic pattern, which in turn makes processes complicated. Particularly, when an corrugated pattern is formed in a light-condensing plane of a solid immersion lens or solid immersion mirror, which is effective for forming near-field light, difficulty is encountered in placing the lens or mirror in a photolithography system, because the lens or mirror has a curved surface. Thus, simple processes have been sought.

Moreover, since plasmon reflectivity from d each corrugation is low plural corrugations are required in order to achieve sufficient reflection. Accordingly, a laser beam must be irradiated onto the corrugated pattern across plural corrugated periods. Therefore, the diameter of the light spot can be converged only to a size in the order of about 1 µm. In this case, the majority of light is reflected and absorbed by the metal film 10, and hence the utilization efficiency of light, i.e., the intensity of emitted near-field light in relation to the intensity of the irradiated laser beam, is low. Even when the diameter of the aperture 10d assumes a value of 0.1 µm, only a utilization efficiency on the order of 2% or thereabouts is achieved.

In particular, in the case of an optical disk drive, the utilization efficiency of light is very important. For example, in the case of a phase-change medium used in a DVD or the like, required recording power density is 1 MW/cm$^2$ or thereabouts. In the case of an aperture having a diameter of 0.1 µm, the irradiated laser beam requires power of about 0.1 mW. Accordingly, in the case of a light utilization efficiency of 2%, the irradiated laser beam requires power of about 50 mW.

In the field of an optical disk, recording density of 1 Tb/(inch)$^2$ is considered to be required in the future. In that case, the diameter of the near-field light must be narrowed to a size of about 30 nm, which in turn reduces the utilization efficiency further. For this reason, much higher power is required for the irradiation. If not, most of the power is not used for recording but is absorbed by the metal film or dissipated in the optical head. As a result, the metal film or the optical head is heated, which raises various problems such as thermal distortion or exfoliation of the film. When the present method is used for photolithography, similar problems arise.

SUMMARY OF THE INVENTION

The present invention provides a near-field light-emitting element which is easy to manufacture and can emit near-field light of high intensity at a high optical utilization efficiency, as well as providing an optical head.

According to an aspect of the present invention, a near-field light-emitting element includes a transparent medium having a plane of incidence into which a laser beam enters, and a light-condensing plane on which the laser beam having entered the plane of incidence is concentrated, and a metal body provided on the light-condensing plane of the transparent medium having a first surface contacting the light-condensing plane, a second surface opposing the first surface, and an aperture which is formed to penetrate through the first surface to the second surface at a position where the laser beam is concentrated and which emits a near-field light obtained from the laser beam. The metal body is arranged apart from a center of the aperture by a predetermined distance to connect together the first surface and the second surface, and has a plasmon reflection plane that reflects toward the aperture a surface plasmon excited on the first and second surfaces by the laser beam concentrated at the aperture.

According to an aspect of the present invention, an optical head includes a transparent medium having a plane of incidence into which a laser beam enters, and a light-condensing plane on which the laser beam having entered the plane of incidence is concentrated, and a metal body provided on the light-condensing plane of the transparent medium having a first surface contacting the light-condensing plane, a second surface opposing the first surface, and an aperture which is formed to penetrate through the first to the second surface at a position where the laser beam is concentrated and which emits a near-field light obtained with the laser beam. The metal body is arranged apart from a center of the aperture by a predetermined distance to connect together the first surface and the second surface, and has a plasmon reflection plane that reflects toward the aperture a surface plasmon excited on the first and second surfaces by the laser beam concentrated near the aperture.

BRIEF DESCRIPTION OF THE DRAWINGS

Embodiments of the present invention will be described in detail based on the following figures, wherein:

FIGS. 1A to 1C show the principal section of an optical head according to a first embodiment of the present invention, wherein FIG. 1A is a front cross-sectional profile of the optical head, FIG. 1B is a cross-sectional profile of the principal section, and FIG. 1C is a bottom view of the principal section;

FIGS. 5A to 5C show the principal section of an optical head according to a second embodiment of the present invention, wherein FIG. 5A is a front cross-sectional profile of the optical head, FIG. 5B is a cross-sectional profile of the principal section, and FIG. 5C is a bottom view of the principal section showing a metal film;

FIGS. 6A and 6B show the principal section of an optical head according to a third embodiment of the present invention, wherein FIG. 6A is a cross-sectional profile of the principal section of the optical head, and FIG. 6B is a bottom view of the principal section showing a metal film;

FIGS. 8A and 8B show the principal section of an optical head according to a fourth embodiment of the present invention, wherein FIG. 8A is a cross-sectional profile of the principal section of the optical head, and FIG. 8B is a bottom view of the principal section showing a metal film;

FIGS. 10A and 10B show the principal section of an optical head according to a fifth embodiment of the present invention, wherein FIG. 10A is a cross-sectional profile of the principal section of the optical head, and FIG. 10B is a bottom view of the principal section showing a metal film.

DETAILED DESCRIPTION OF THE INVENTION

First Embodiment

Figure 1A:
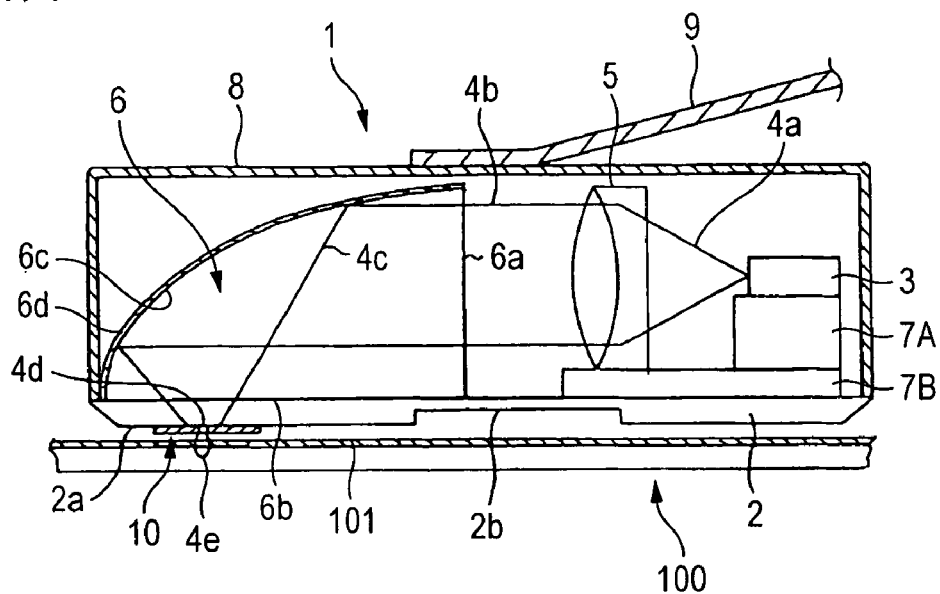
Figure 1B:
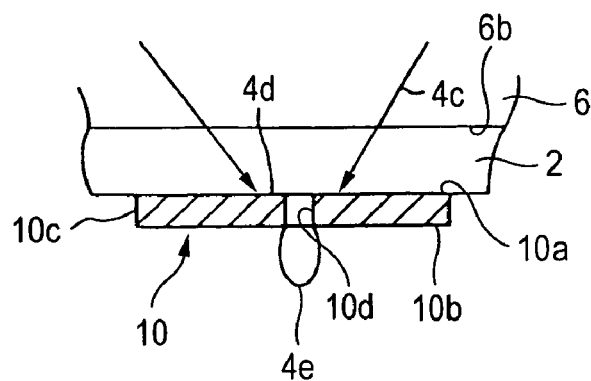
Figure 1C:
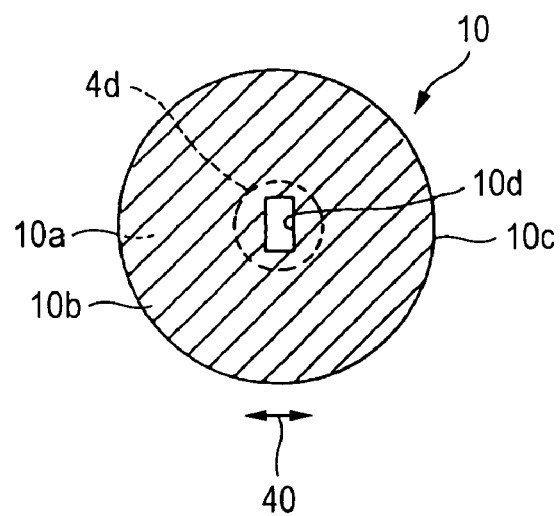

FIGS. 1A to 1C show the principal section of an optical head according to a first embodiment of the present invention. FIG. 1A is a front cross-sectional profile of the optical head, FIG. 1B is a cross-sectional profile of the principal section, and FIG. 1C is a bottom view of the principal section.

The optical head 1 has a flying slider 2 which travels, in a flying manner, over an optical disk 100 in which is formed a recording layer 101. Placed on top of this flying slider 2 are a semiconductor laser 3 for emitting a laser beam 4a, a collimator lens 5 for shaping the laser beam 4a emitted from the semiconductor laser 3 into collimated light 4b, and a transparent medium 6 which concentrates the collimated light 4b output from the collimator lens 5 on a lower surface 2a serving as a light-condensing plane of the flying slider 2, to thus form a light spot 4d. A metal film 10 having a rectangular aperture 10d for emitting near-field light 4e is deposited on the lower surface 2a of the flying slider 2. The semiconductor laser 3, the collimator lens 5, and the transparent medium 6 are housed in a head case 8. This head case 8 is supported by a suspension 9. The semiconductor laser 3 and the collimator lens 5 are retained by the flying slider 2 by means of retaining sections 7A and 7B made of a fused quartz plate.

The transparent medium 6 is formed through use of a first plane 6a serving as a plane of incidence into which the collimated light 4b enters, and a portion of a paraboloid of revolution. The transparent medium 6 has a third plane 6c serving as a reflection plane which reflects the laser beam having entered the first plane 6a through use of a reflection film 6d provided on the surface of the third plane 6c, and a second plane 6b which comes into contact with the flying slider 2. Moreover, a material whose refractive index is greater than one and which has a translucent characteristic, for instance, glass BK7 (a refractive index of 1.5), dense flint glass (a refractive index of 1.91), cadmium sulfide CdS (a refractive index of 2.5), sphalerite ZnS (a refractive index of 2.37), or the like, can be used as a material for the transparent medium 6. A portion of a spheroid may also be used for forming the third plane 6c. In addition, the reflection plane may also be formed from a hologram or a diffraction grating.

The flying slider 2 is formed from a material whose diffraction grating is equal to that of the transparent medium 6 and has a translucent characteristic. A recessed section 2b is formed such that negative pressure generated in areas other than surroundings of the light spot 4d formed on the lower surface 2a. A distance between the metal film 10 and the optical disk 100 is maintained constantly by means of the negative pressure generated by the recessed section 2b and the spring force of the suspension 9. The transparent medium 6 and the flying slider 2 may be reasonably formed into a single piece.

For instance, a InGaP-based edge emitting semiconductor laser having a wavelength of 650 nm can be used for the semiconductor laser 3. A direction 40 into which the laser beam emitted from the semiconductor laser 3 is to be polarized is perpendicular to the longitudinal direction of the rectangular aperture 10d. By means of this configuration, surface plasmon is resonantly coupled with the laser beam on the surface of the metal film 10 to thus be excited. Further, the surface plasmon propagates to the edge surface 10c of the metal film 10 and is reflected by the edge surface 10c to thus converge at the aperture 10d. By means of the converging plasmon, the near-field light 4e emitted from the aperture 10d is significantly enhanced.

The laser beam may also be circularly polarized, which make it possible to excite surface plasmon resonantly in both longitudinal and perpendicular direction of the rectangular aperture. In an optical disk system, such as a phase-change optical disk drive, because a λ/4 plate must be placed at an arbitrary position along the optical pass of the optical system in order to separate the incident light and the reflected light from each other, circularly-polarized light is irradiated on the plane of the optical disk consequently. In this case, this optical system can be used in unmodified form, and hence circular polarization is advantageous even in this regard.

(Structure of a Metal Film)

The metal film 10 is made from a metal material having low electrical resistance, e.g., gold (Au), silver (Ag), aluminum (Al), or the like. As shown in FIG. 1B, the metal film 10 includes the first surface 10a deposited on the lower surface 2a of the flying slider 2, the second surface 10b formed at a position opposing the first surface 10a, the aperture 10d that assumes a rectangular shape (measuring, e.g., 0.05×0.1 μm) and penetrates through the first to the second surface 10a, 10b, and the edge surface 10c which is arranged a predetermined distance away from the aperture 10d and serves as a plasmon reflection plane. The metal film 10 has a thickness (e.g., about 50 nm) sufficient for blocking the laser beam, and the distance (radius) from the center of the aperture 10d to the edge surface 10c is set to a size less than or equal to the resonance frequency of the surface plasmon (e.g., 0.5 μm).

(Preparation of the Metal Film)

The metal film 10 can be prepared by depositing a metal film on an object of film-deposition (i.e., the lower surface 2a of the flying slider 2) and, subsequently, etching the metal film through photolithography. The metal film can also be formed by depositing a metal film on an object of film-deposition, forming a resist pattern on the thus-deposited metal film, and, subsequently, lifting off the metal film around the object through use of the resist film. These preparation methods enable preparation of the metal film 10 through a single photolithography process, and hence are extremely efficient.

(Operation of the Optical Head)

Operation of the optical head will be described below. The laser beam 4a emitted from the semiconductor laser 3 is shaped into the collimated light 4b by means of the collimator lens 5, and the thus-collimated light enters the first plane 6a of the transparent medium 6. The collimated light 4b having entered the first plane 6a of the transparent medium 6 is reflected by the reflection film 6d formed on the surface of the third plane 6c of the transparent medium 6, to thus converge at the aperture 10d of the metal film 10 provided on the lower surface 2a of the flying slider 2. The laser beam having concentrated at the aperture 10d induces excitation of surface plasmon on the first and second surfaces 10a, 10b of the metal film 10. The thus-excited surface plasmon propagates to an outer periphery, and the majority of the surface plasmon reflected by the edge surface 10c travels toward the aperture 10d and converges at the same. Hence, the near-field light 4e emitted from the aperture 10d is significantly enhanced by means of interaction between the laser beam and the plasmon in the vicinity of the aperture 10d. In the first embodiment, the metal almost breaks off at the edge surface 10c of the metal film 10, in contrast with the corrugated pattern formed in a related-art metal film. Consequently, the majority of the plasmon having propagated is reflected. For this reason, the enhancement effect is greatly increased when compared with the case of the related-art metal film.

Figure 2:
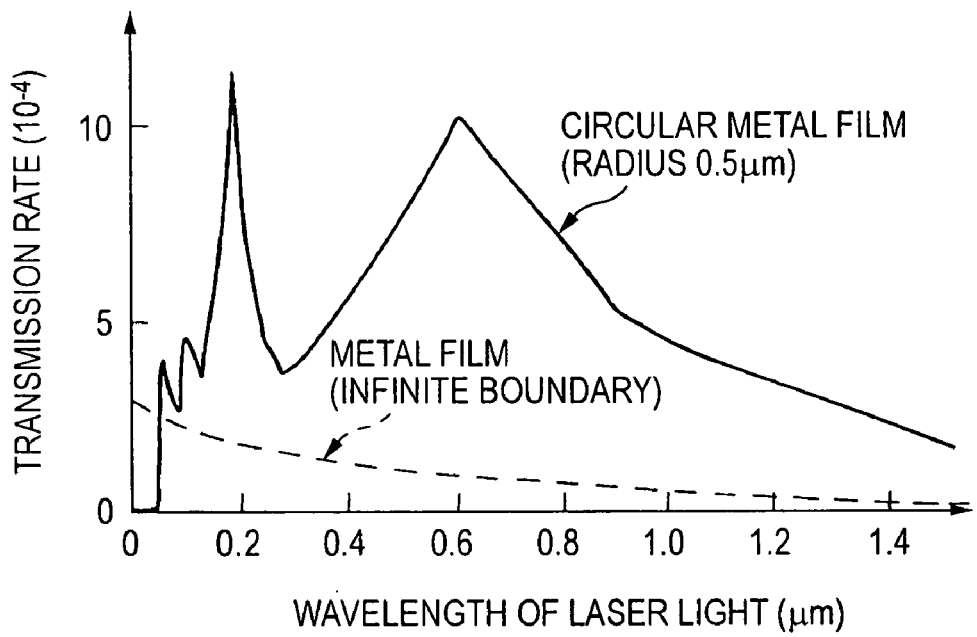
FIG. 2 shows a simulation result showing wavelength dependence of near-field light attributable to plasmon resonance excitation according to the first embodiment of the present invention.

FIG. 2 shows a result of computation, through use of an FDTD (Finite-Difference Time-Domain) method, of a wavelength dependence of field intensity of the near-field light 4e emitted from the aperture 10d by means of excitation of plasmon performed by the first and second surfaces 10a, 10b of the metal film 10 according to the first embodiment. As can be seen from the drawing, the embodiment indicated by a solid line exhibits a considerably broad resonance effect from a wavelength of 500 nm to 900 nm. When compared with a case where the field intensity spreads endlessly without a boundary of the metal film (as indicated by a broken line), ten-fold or greater enhancement is exhibited. As mentioned above, the enhancement effect equivalent to that exhibited in the related-art case is ascertained to be attained by reflection induced by a single boundary of the metal film, as well. Since the wavelength dependence of resonance excitation is broad, significant fluctuations do not arise in an output even when the laser wavelength has fluctuated. Even when the radius of the metal film 10 is changed within the range of 0.3 to 1 μm or thereabouts, the enhancement effect can be exhibited.

(Advantage of the First Embodiment)

The first embodiment yields the following advantages.

(A) Since the surface plasmon excited by the first and second surfaces 10a, 10b of the metal film 10 is reflected by the edge surface 10c, the near-field light 4e emitted from the aperture 10d can be significantly enhanced by means of interaction between the laser beam 4c concentrated at the aperture 10d and the surface plasmon, thereby enhancing the utilization efficiency of light.

(B) In contrast with the periodic corrugated structure of the related-art embodiment, the plasmon excited around the metal film is almost totally reflected. Accordingly, a sufficient enhancement effect is achieved by means of only a single metal film 10, so that the structure and manufacturing processes can be greatly simplified.

(C) Since the wavelength dependence of resonance plasmon excitation is broad, an output is liable to few changes attributable to fluctuations in the wavelength of an employed laser. Moreover, there is no necessity for highly-accurate adjustment of a film size in relation to the wavelength of an employed laser. High-yield manufacturing processes become feasible.

(D) The only requirement is to shape the metal film into a mere circular or rectangular shape. The metal film can be readily formed through use of ordinary photolithography, and hence manufacturing cost can be curtailed.

The present optical head enables recording/playback operation while the distance between the optical head and a disk surface is kept minute (20 nm or thereabouts) through use of the flying slider 2. However, the present optical head is not limited to this. Needless to say, the optical head of a type which uses the intensity of light reflected from a disk also yields the same advantage as that yielded in the present embodiment, through use of the present metal film.

Figure 3:
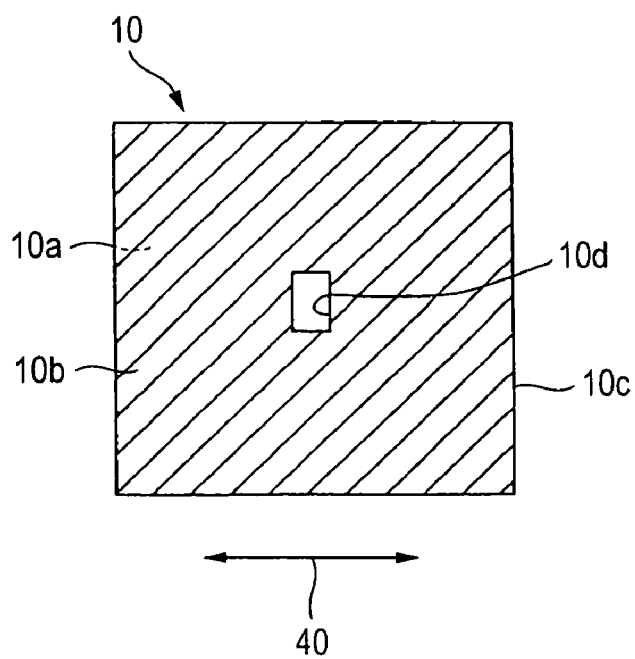
FIG. 3 is a view showing a modification of an outer shape of a metal film according to the first embodiment of the present invention.

FIG. 3 shows a modification of an outer shape of the metal film 10 according to the first embodiment. As shown in FIG. 3, even when the outer shape of the metal film 10 is given a rectangular shape whose one side has a length double the radius of the metal film 10 shown in FIGS. 1A to 1C, an enhancement effect analogous to that yielded above is obtained. Moreover, even when the outer shape is made into an oval shape, an enhancement effect similar to that mentioned above is also yielded.

Figure 4A:
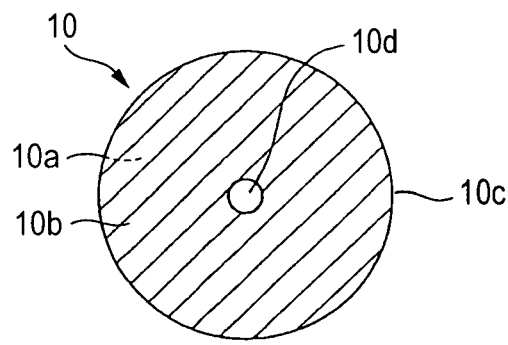
FIGS. 4A to 4F are views showing modifications of an aperture of the metal film according to the first embodiment of the present invention.
Figure 4B:
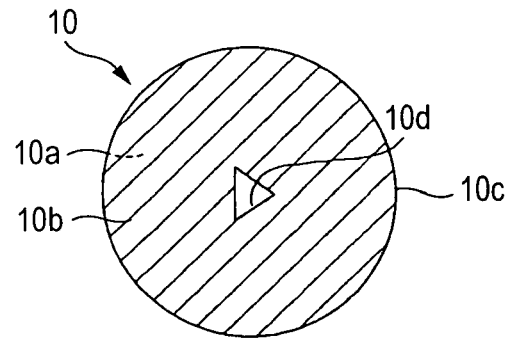
Figure 4C:
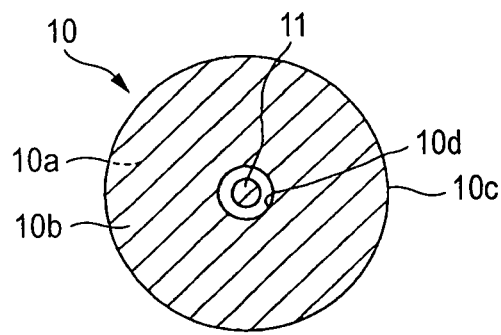
Figure 4D:
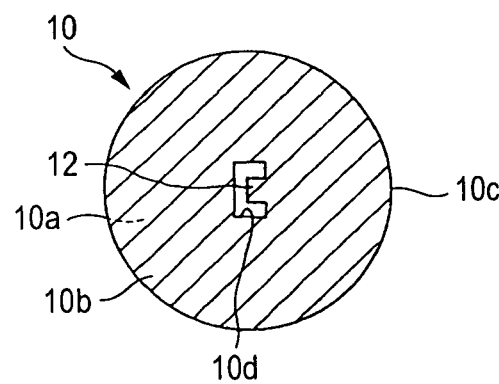
Figure 4E:
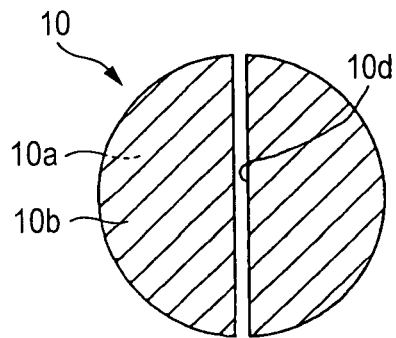
Figure 4F:
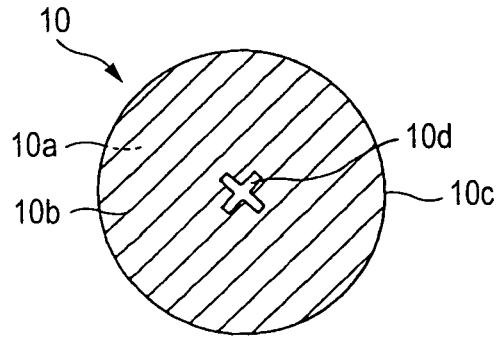

FIGS. 4A to 4F show modifications of the aperture of the metal film 10 according to the first embodiment. Even when the aperture 10d of the metal film 10 is formed into any of the shapes shown in FIGS. 4A to 4F, the aperture has an enhancement effect analogous to that mentioned above. Specifically, even when the shape of the aperture 10d is formed into a circular shape shown in FIG. 4A or a triangular shape shown in FIG. 4B, an enhancement effect analogous to that mentioned above is yielded. The shape of the aperture 10d may be formed into a coaxial shape shown in FIG. 4C, wherein a minute metal section 11 is arranged concentrically around the center of the circular aperture 10d. Alternatively, the shape of the aperture 10d may be formed into a concave shape having a protruding section 12 at the center thereof, as shown in FIG. 4D. This enables further enhancement of the emitted near-field light 4e. Even when the shape of the aperture 10d is formed into a slit shape shown in FIG. 4E, an enhancement effect similar to that mentioned previously is yielded. The shape of the aperture 10d may be formed into the shape of a cross, as shown in FIG. 4F. As a result, the near-field light 4e in a crossed section of the cross can be greatly enhanced. As illustrated, the minute metal section 11 shown in FIG. 4C may be formed into another shape such as a circular shape, a rectangular shape, or the like.

Second Embodiment

Figure 5A:
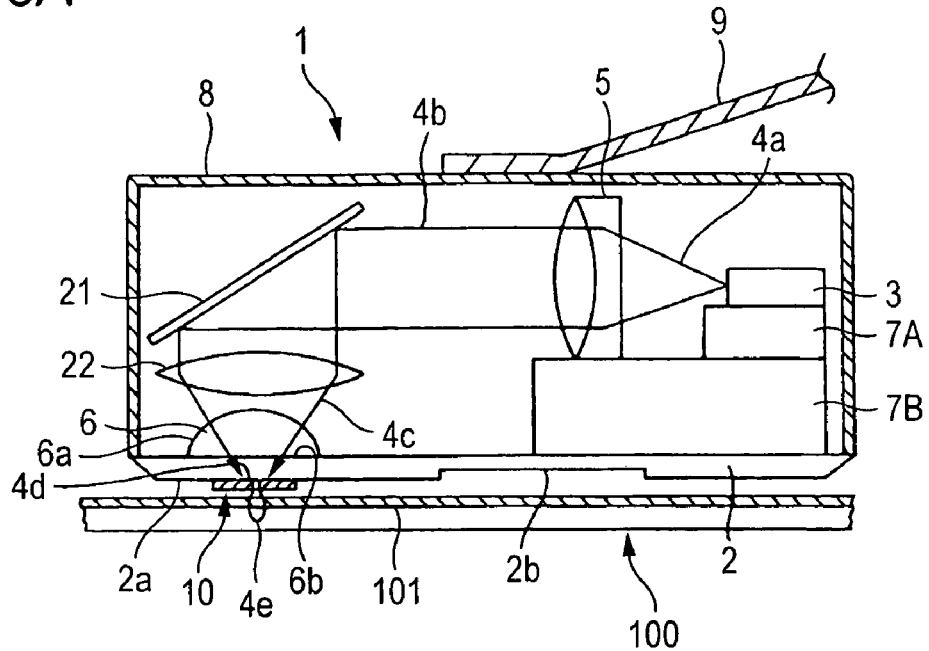
Figure 5B:
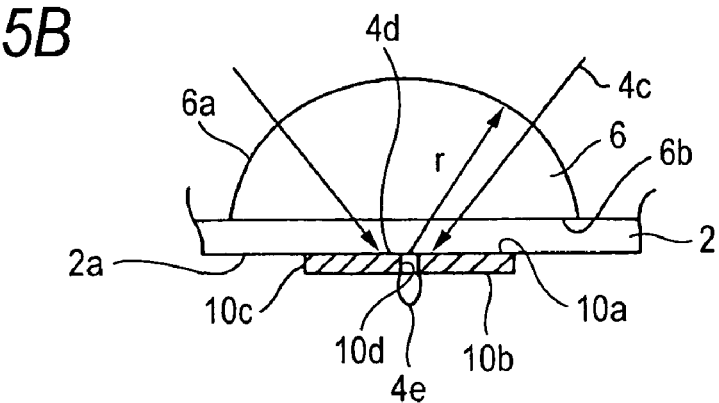
Figure 5C:
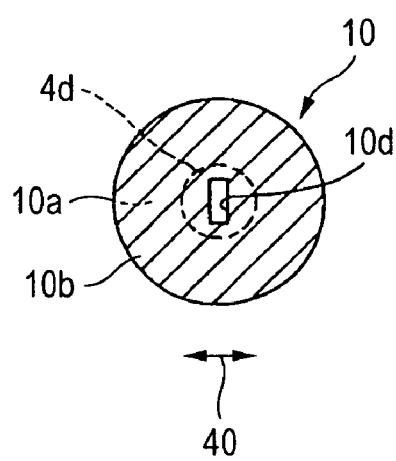

FIGS. 5A to 5C show the principal section of an optical head according to a second embodiment of the present invention. FIG. 5A is a front cross-sectional profile of the optical head, FIG. 5B is a cross-sectional profile of the principal section, and FIG. 5C is a bottom view of the principal section, showing a metal film. In connection with the first embodiment, the second embodiment employs a transparent medium 6 formed from a return mirror 21, a light-condenser lens 22, and a solid immersion lens, in place of the transparent medium 6 using the paraboloid of revolution. In other respects, the second embodiment is configured in the same manner as is the first embodiment.

This transparent medium 6 is made from, e.g., Nd-based dense flint NdFD13 (having a refractive index of 1.91) and has a semi-circular first surface 6a which has a radius "r" from the center of the aperture 10d of the metal film 10.

As in the case of the first embodiment, the metal film 10 is provided on the lower surface 2a of the flying slider 2, is formed from, e.g., gold (Au), and has a thickness (e.g., 50 nm) sufficient for blocking the laser beam. Moreover, the outer shape of the metal film 10 assumes a circular shape having a radius of 0.3 μm. As in the case of the first embodiment, the rectangular aperture 10d measuring 0.05×0.1 μm is provided at the center of the metal film 10.

(Advantage of the Second Embodiment)

According to the second embodiment, as in the case of the first embodiment, when the aperture 10d is exposed to the laser beam 4d whose polarizing direction 40 is perpendicular to the longitudinal direction of the rectangular aperture 10d, surface plasmon is excited on the first and second surfaces 10a, 10b of the metal film 10. The surface plasmon is reflected by the edge surface 10c at the perimeter of the metal film 10, to thus converge at the aperture 10d. Accordingly, the near-field light 4e emitted from the aperture 10d can be much enhanced by the thus-converging plasmon.

As a result of a semi-spherical solid immersion lens being used as the transparent medium 6, the spot size of the laser beam irradiated on the aperture 10d can be concentrated into a size of 0.2 μm or less. As a result, the intensity of the laser beam irradiated to the aperture 10d is increased. Therefore, when compared with the first embodiment, the intensity of the near-field light 4e emitted from the aperture 10d can be increased further, to thus enhance the utilization efficiency of light.

In addition to the solid immersion lens, an ultra-semi-spherical solid immersion lens having the shape of a bottom-truncated sphere may also be used as the transparent medium. As a result, the number of apertures used for gathering light can be increased further, and a smaller beam spot 4d can be obtained. Therefore, the utilization efficiency of light can be enhanced further.

Third Embodiment

Figure 6A:
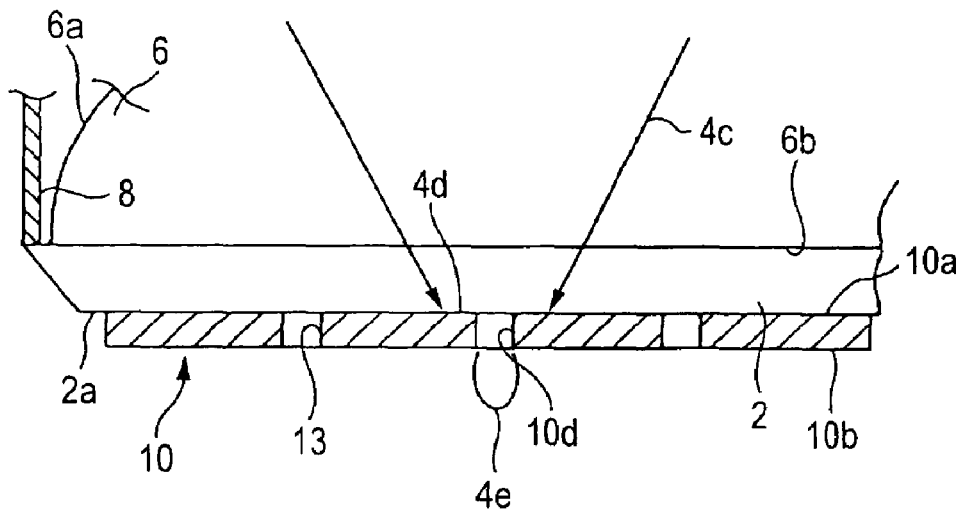
Figure 6B:
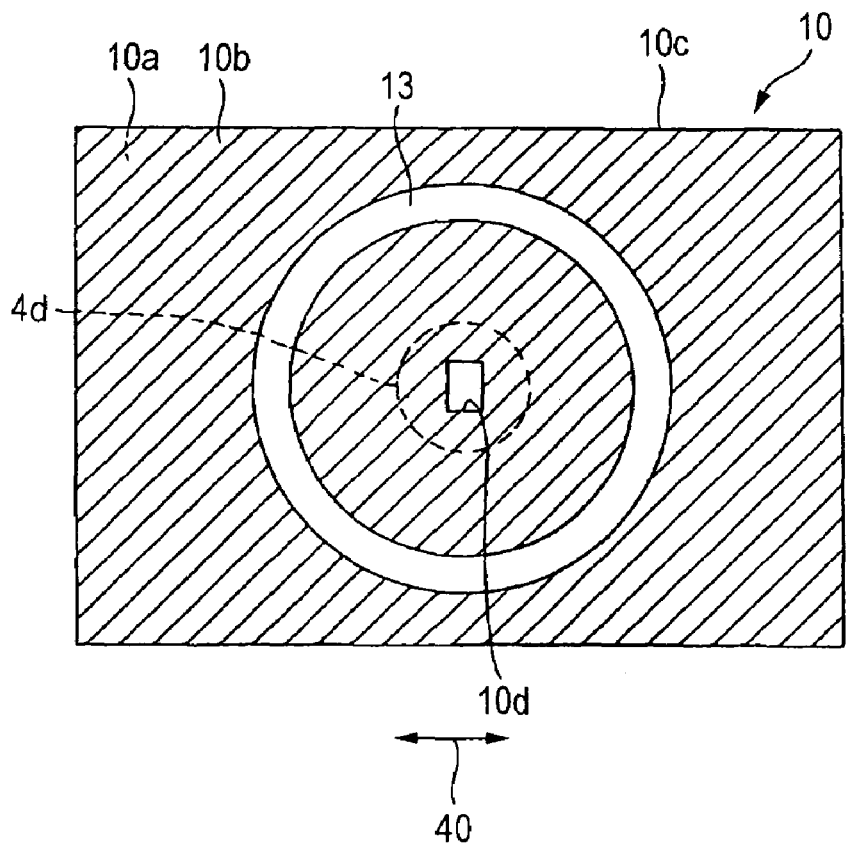

FIGS. 6A and 6B show the principal section of an optical head according to a third embodiment of the present invention. FIG. 6A is a cross-sectional profile of the principal section of the optical head, and FIG. 6B is a bottom view of the principal section, showing a metal film. In connection with the first or second embodiment, the outer shape of the metal film 10 is formed into a rectangular shape, and in the third embodiment a slit 13 is formed in addition to the aperture 10d. In other respects, the third embodiment is configured in the same manner as is the first or second embodiment.

The metal film 10 assumes a rectangular outer shape, has the rectangular aperture 10d provided at a position where the laser beam is to be concentrated, and the circular slit 13 centered on the aperture 10d. The distance from the center of the aperture 10d to the inner wall of the slit 13 is set to a size on the order of the resonance wavelength of the surface plasmon generated on the surfaces 10a, 10b of the metal film 10.

According to the third embodiment, when the laser beam 4d whose polarizing direction 40 is perpendicular to the longitudinal direction of the rectangular aperture 10d is irradiated on the aperture 10d, the surface plasmon is excited on the first and second surfaces 10a, 10b of the metal film 10. The surface plasmon is reflected by the inner wall surface of the slit 13, to thus converge at the aperture 10d. The near-field light 4e emitted from the aperture 10d can be significantly enhanced by means of the converging plasmon.

Figure 7:
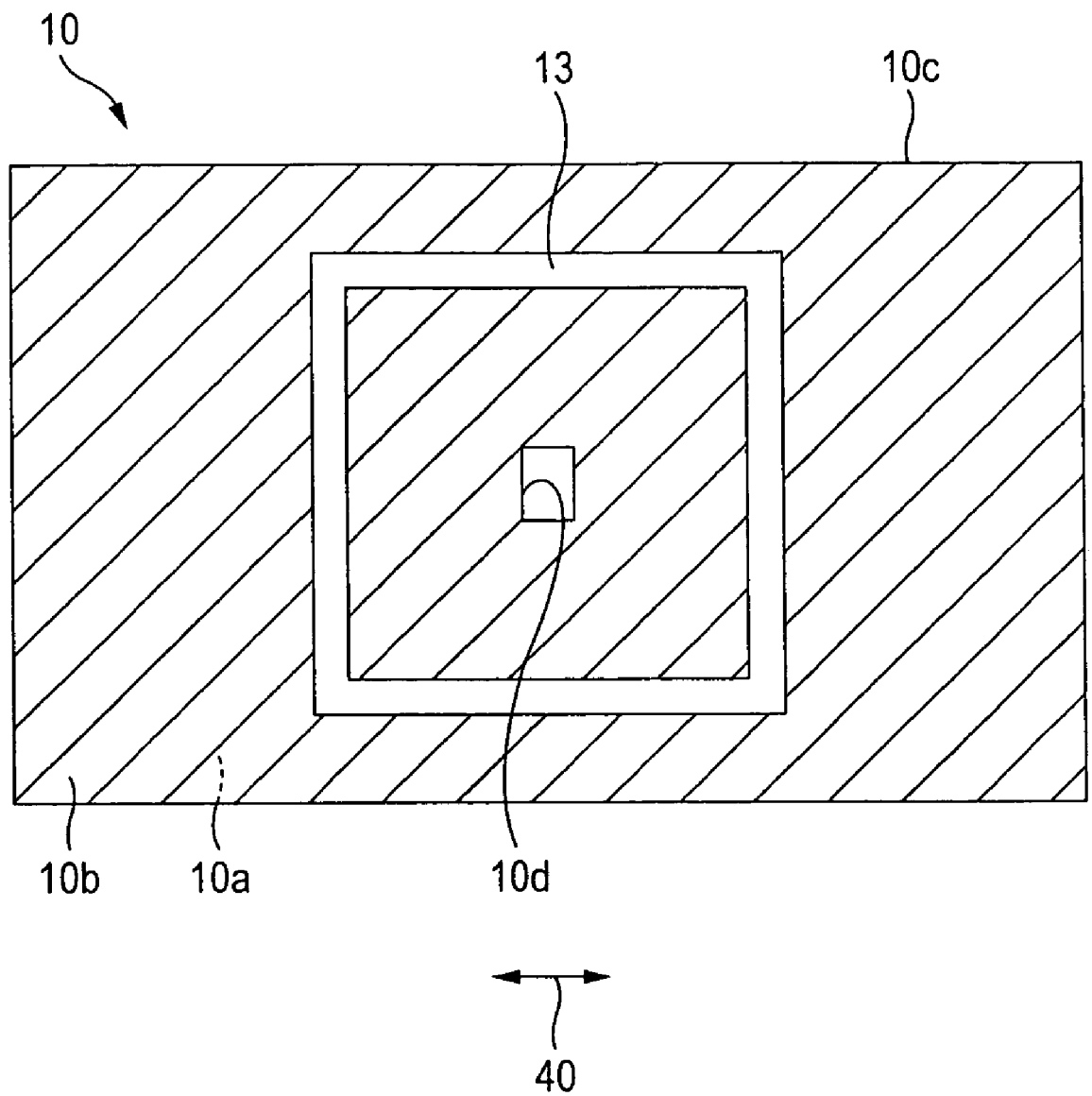
FIG. 7 is a view showing a modification of a metal film according to the third embodiment of the present invention.

FIG. 7 shows a modification of the metal film 10 according to the third embodiment. As shown in FIG. 7, the slit 13 of the metal film 10 may assume a rectangular shape. The effect for enhancing the near-field light 4e can be yielded even when such a metal film 10 is used.

Fourth Embodiment

Figure 8A:
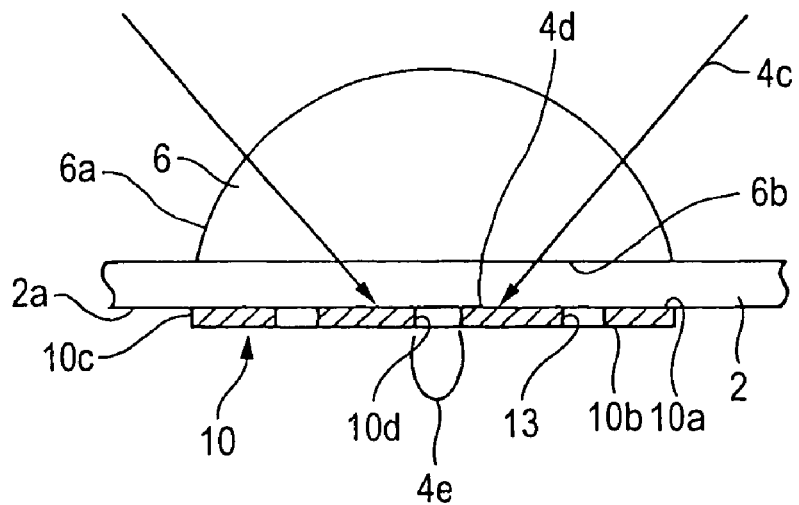
Figure 8B:
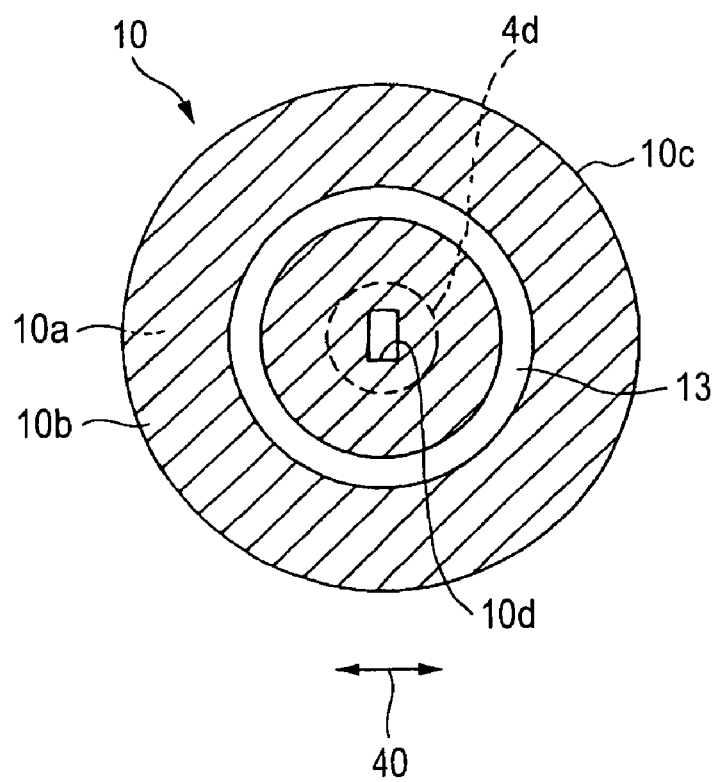

FIGS. 8A and 8B show the principal section of an optical head according to a fourth embodiment of the present invention. FIG. 8A is a cross-sectional profile of the principal section of the optical head, and FIG. 8B is a bottom view of the principal section, showing a metal film. In connection with the second embodiment, the slit 13 is formed in the metal film 10 in addition to the aperture 10d in the fourth embodiment. In other respects, the fourth embodiment is configured in the same manner as is the second embodiment. By means of this configuration, as in the case of the third embodiment, the excited surface plasmon is reflected by the inner wall surface of the slit 13 to thus converge at the aperture 10d. Hence, the near-field light 4e emitted from the aperture 10d can be significantly enhanced.

Figure 9A:
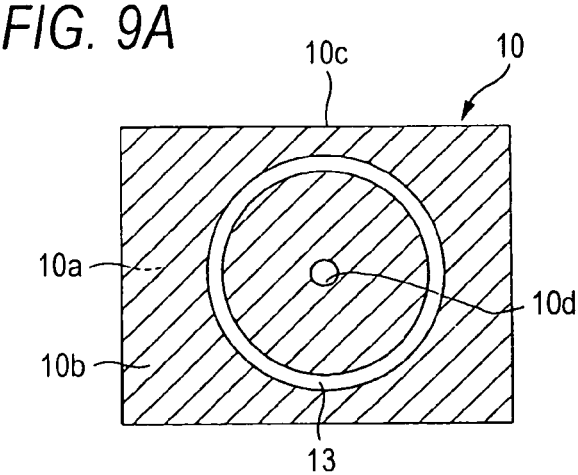
FIGS. 9A to 9F are views showing modifications of a metal film according to the fourth embodiment of the present invention.
Figure 9B:
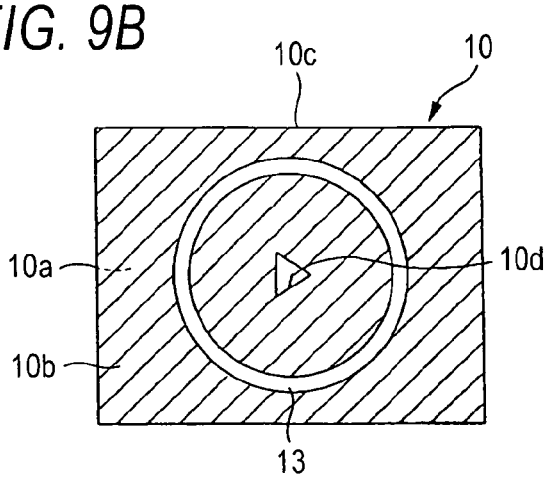
Figure 9C:
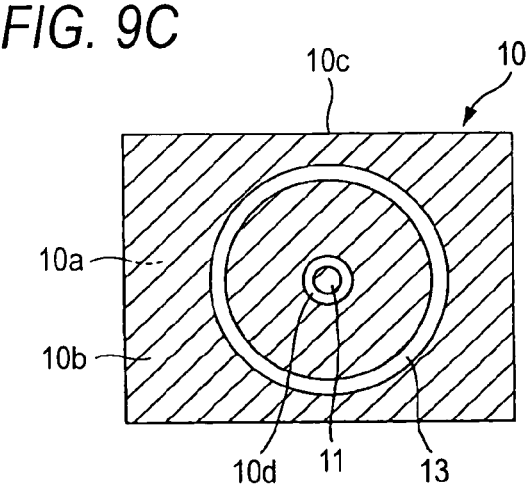
Figure 9D:
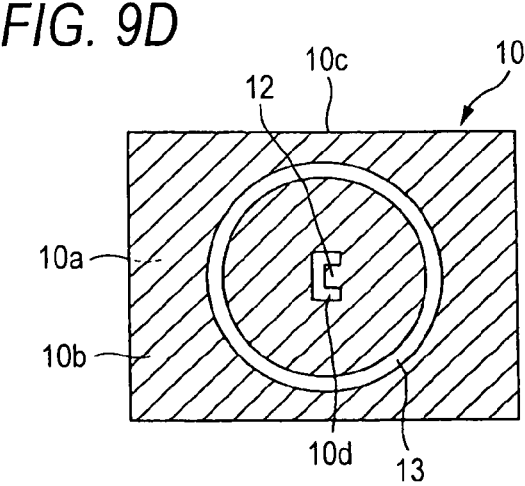
Figure 9E:
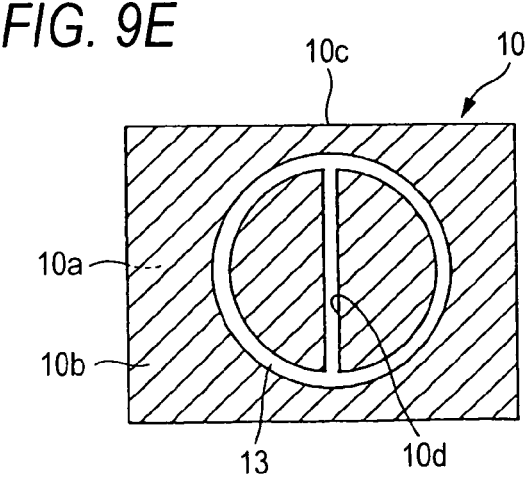
Figure 9F:
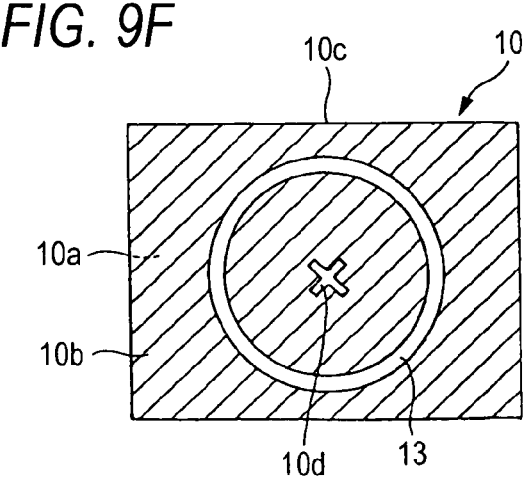

FIGS. 9A to 9F show modifications of the aperture of the metal film 10 according to the fourth embodiment. Even when the shape of the aperture 10d of the metal film 10 is formed into any of the shapes shown in FIGS. 9A to 9F, an enhancement effect analogous to that mentioned previously is exhibited. Namely, even when the shape of the aperture 10d is formed into a circular shape shown in FIG. 9A or a triangular shape shown in FIG. 9B, the enhancement effect similar to that mentioned previously. Alternatively, the shape of the aperture 10d may be formed into a coaxial shape, wherein the minute metal section 11 is arranged coaxially around the circular aperture 10d, as shown in FIG. 9C, or a concave shape having a protruding section 12 at the center as shown in FIG. 9D. As a result, the emitted near-field light 4e can be enhanced further. Even when the shape of the aperture 10d is formed into a slit, as shown in FIG. 9E, an enhancement effect analogous to that mentioned previously is exhibited. In addition, the shape of the aperture 10d may be formed into the shape of a cross, as shown in FIG. 9F. As a result, the near-field light 4e at the center of the cross can be enhanced to a much greater extent. The minute metal section 11 shown in FIG. 9C may assume another shape such as a rectangular shape in addition to the circular shape, as illustrated.

Fifth Embodiment

Figure 10A:
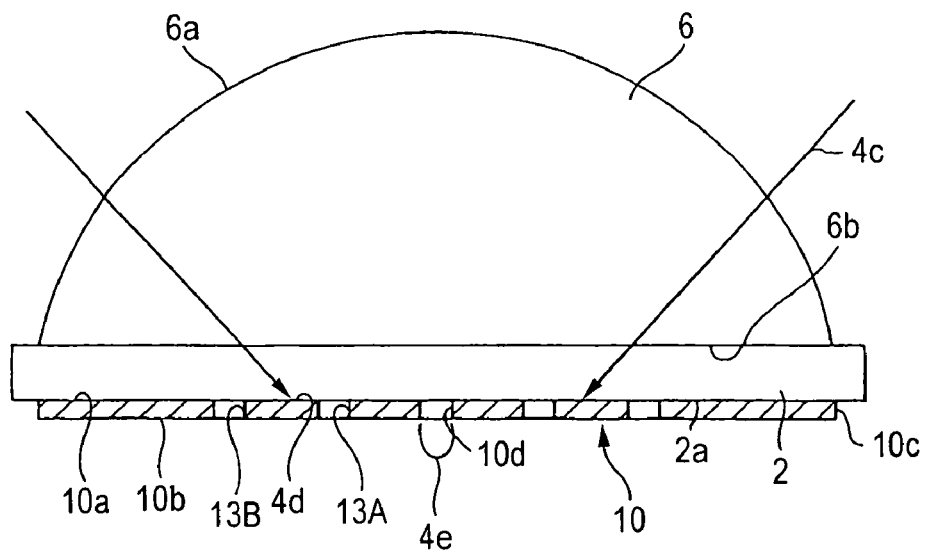
Figure 10B:
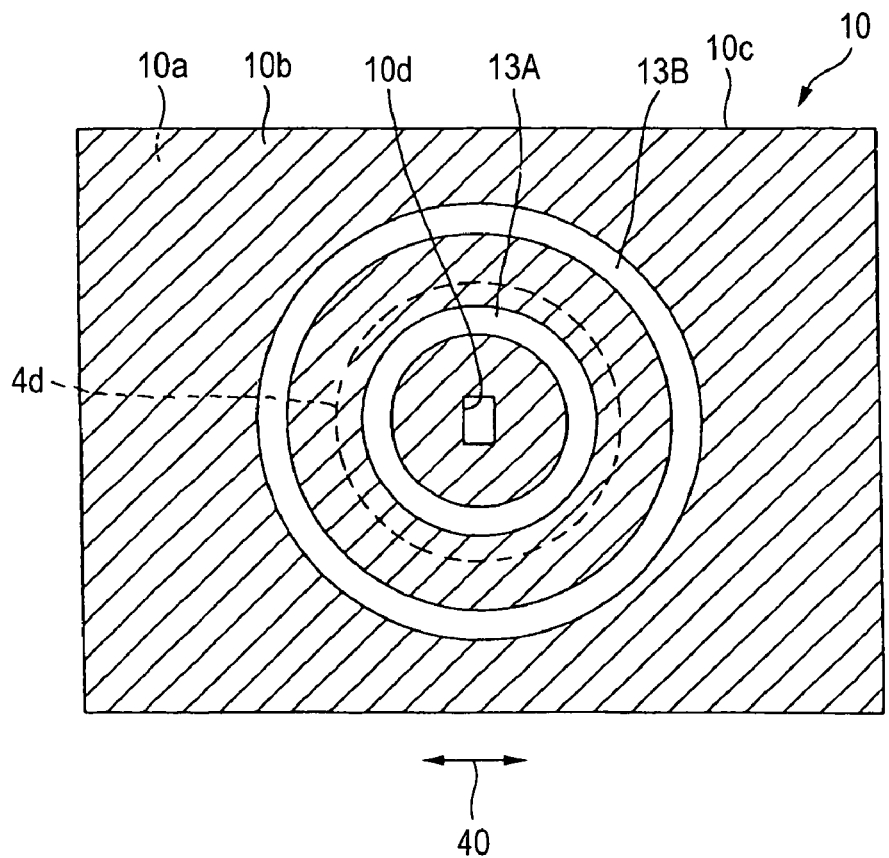
Figure 11A:
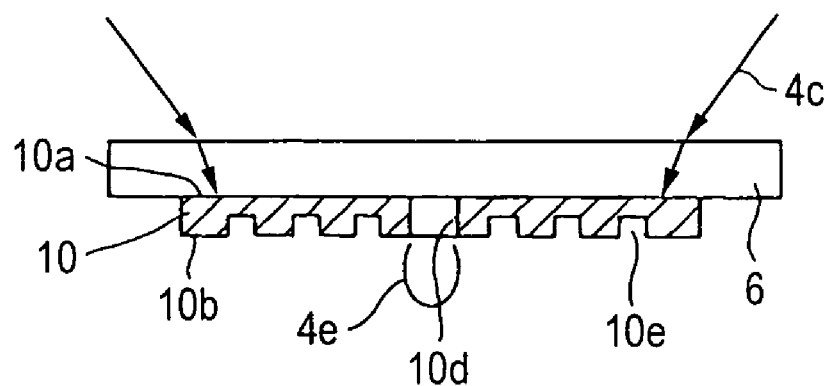
FIGS. 11A and 11B are views showing a related-art plasmon resonance excitation pattern.
Figure 11B:
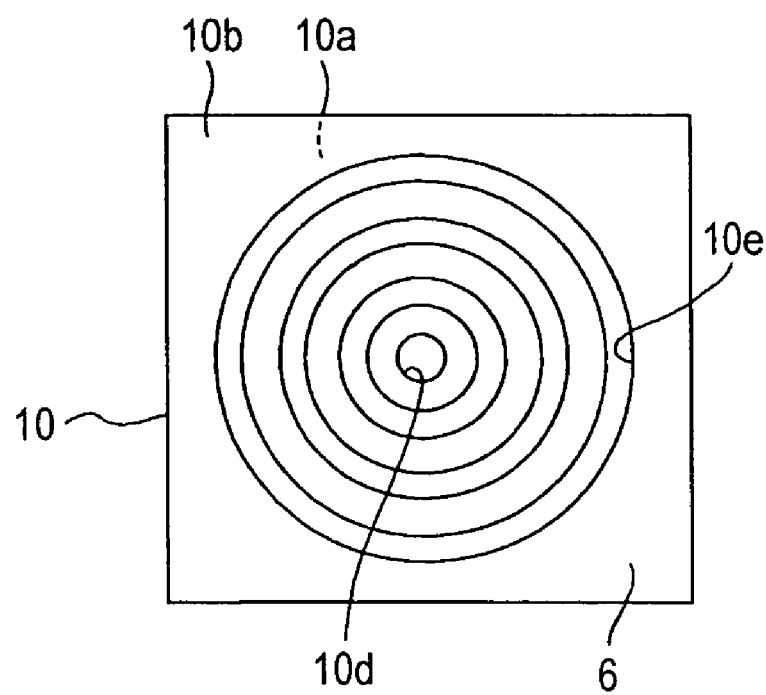

FIGS. 10A and 10B show the principal section of an optical head according to a fifth embodiment of the present invention. FIG. 10A is a cross-sectional profile of the principal section of the optical head, and FIG. 10B is a bottom view of the principal section, showing a metal film. In connection with the second embodiment, two slits 13 are formed in the metal film 10 in addition to the aperture 10d in the fifth embodiment. In other respects, the fifth embodiment is configured in the same manner as is the second embodiment.

This metal film 10 assumes a rectangular outer shape, and has a rectangular aperture 10d at a position where the laser beam is to be concentrated and the plural circular slits 13 around the aperture 10d. The distance from the center of the aperture 10d to the inner wall surface of the innermost slit 13 is set to a size on the order of the resonance wavelength of the surface plasmon generated on the surfaces 10a, 10b of the metal film 10.

According to the fifth embodiment, the excited surface plasmon is reflected by wall surfaces of the plural slits 13, to thus converge at the aperture 10d. The near-field light 4e emitted from the aperture 10d can be significantly enhanced. Moreover, the beam spot 4d may be given a size which subsumes the outermost slit 13B.

The present invention is not limited to the embodiments provided above and is susceptible to various modifications without changing the gist of the invention. Constituent elements of the respective embodiments can be arbitrarily combined with each other.

The transparent medium 6 may be formed from a dielectric crystal, semiconductor, or the like in addition to glass. The transparent medium 6 and the flying slider 2 may be formed integrally.

The near-field light-emitting element of the present invention can be applied to a near-field microscope or photolithography in addition to the above-described optical head.

In the second through fifth embodiments, a convex lens is used as the light-gathering lens 22. However, a Fresnel lens, a hologram lens, a gradient index lens, or the like may be used.

According to the embodiments, surface plasmon is excited on the first and second surfaces of the metal body by the laser beam concentrated at the aperture of the metal body. The surface plasmon propagates to areas around the location where surface plasmon has been excited and undergoes total reflection on the plasmon reflection plane to thus converge to the aperture. By means of interaction between the thus-converged plasmon and the laser beam concentrated at the aperture, the near-field light emitted from the aperture is enhanced.

The metal body may be formed from a metal film or a metal plate. Moreover, the plasmon reflection plane may be an edge surface forming an outer shape of the metal film. In this case, a distance from the center of the aperture of the metal body to the edge surface may preferably be on the order of the resonance wavelength of the surface plasmon excited by the metal body. The outer shape of the metal film may be a circular shape, a rectangular shape, or an oval shape. Moreover, the aperture may have a circular shape or a rectangular shape or may be formed into a slit pattern.

The plasmon reflection plane may also be an inner wall surface of a circular or rectangular slit formed around the aperture. In this case, the distance from the center of the aperture to the inner wall surface of the slit is preferably on(in?) the order of the resonance wavelength of the surface plasmon excited by the metal body.

The plasmon reflection surface may also be inner wall surfaces of plural circular, rectangular, or the like, slits formed around the aperture. In this case, the distance from the center of the aperture to the inner wall surface of the innermost slit is preferably on the order of the resonance wavelength of the surface plasmon or thereabouts. The pitch between the plural slits is preferably on the order of the wavelength of the excited surface plasmon.

As has been described, according to the near-field light-emitting element and the optical head, both pertaining to the present invention, the surface plasmon excited by the surface of the metal body is reflected toward the aperture by means of the plasmon reflection plane, whereby the near-field light emitted from the aperture can be significantly enhanced by means of interaction between a laser beam concentrated on the aperture and the surface plasmon. The size of the spot size of the laser beam can be reduced to the order of aperture because it is enough for the spot to cover the aperture sufficiently, the optical throughput of the element can be increased by the reduction.

The entire disclosure of Japanese Patent Application No. 2004-216210 filed on Jul. 23, 2004 including specification, claims, drawings and abstract is incorporated herein by reference in its entirety.

What is claimed is:

1. A near-field light-emitting element comprising:
   a transparent medium having:
   a plane of incidence into which a laser beam enters; and
   a light-condensing plane on which the laser beam having entered the plane of incidence is concentrated; and a
   metal body provided on the light-condensing plane of the transparent medium having:
   a first surface contacting the light-condensing plane;
   a second surface opposing the first surface; and
   an aperture which is formed to penetrate through the first surface to the second surface at a position where the laser beam is concentrated and which emits a near-field light obtained from the laser beam, wherein
   the metal body is arranged apart from a center of the aperture by a predetermined distance to connect together the first surface and the second surface, and has a plasmon reflection plane that reflects toward the aperture a surface plasmon excited on the first and second surfaces by the laser beam concentrated at the aperture.

2. The near-field light-emitting element according to claim 1, wherein
   a distance from the center of the aperture of the metal body to the plasmon reflection plane corresponds to a resonance wavelength, or thereabouts, of the surface plasmon excited by the metal body.

3. The near-field light-emitting element according to claim 1, wherein
a distance from the center of the aperture of the metal body to the plasmon reflection plane is greater than or equal to a radius of a light spot of the laser beam concentrated at the metal body.

4. The near-field light-emitting element according to claim 1, wherein
the aperture of the metal body has a size equal to a wavelength of the laser beam or less.

5. The near-field light-emitting element according to claim 1, wherein
the aperture of the metal body is formed in a shape of a slit from an outer brim of one of the first and second surfaces to an outer brim of the remaining surface.

6. The near-field light-emitting element according to claim 1, wherein
the metal body assumes a circular outer shape, and an edge surface forming the outer shape is taken as the plasmon reflection plane.

7. The near-field light-emitting element according to claim 1, wherein
the metal body assumes a rectangular outer shape, and an edge surface forming the outer shape is taken as the plasmon reflection plane.

8. The near-field light-emitting element according to claim 1, wherein
the metal body assumes an essentially circular or rectangular shape centered on the aperture and has a slit penetrating through the first surface to the second surface, and
an inner wall surface of the slit is taken as the plasmon reflection plane.

9. The near-field light-emitting element according to claim 8, wherein
a distance from the center of the aperture to the wall surface of the slit corresponds to a resonance wavelength, or thereabouts, of the surface plasmon excited by the metal body.

10. The near-field light-emitting element according to claim 1, wherein
the metal body assumes an essentially concentric or rectangular shape centered on the aperture and has a plurality of slits penetrating almost through the first and second surfaces, and
inner wall surfaces of the plurality of slits are taken as the plasmon reflection planes.

11. The near-field light-emitting element according to claim 10, wherein
a distance from the center of the aperture to an inner wall surface of the innermost slit among the plurality of slits corresponds to a resonance wavelength, or thereabouts, of the surface plasmon excited by the metal body.

12. The near-field light-emitting element according to claim 1, wherein
the plane of incidence has a spherical plane into which the laser beam is concentrated by a light-condensing optical system enters.

13. The near-field light-emitting element according to claim 1, wherein
the transparent medium has a reflection plane which reflects the laser beam having entered the plane of incidence to converge at the light-condensing plane.

14. The near-field light-emitting element according to claim 13, wherein
the reflection plane is formed through use of a portion of a spheroid or a paraboloid of revolution.

15. The near-field light-emitting element according to claim 1, wherein
the metal body has a minute metal body at the center of the aperture, and
a shape of a coaxial-type aperture is formed by the aperture and the minute metal body.

16. The near-field light-emitting element according to claim 1, wherein
the metal body has a protuberance section projecting into the aperture from a brim thereof.

17. The near-field light-emitting element according to claim 1, wherein the aperture of the metal body assumes a rectangular shape, and
the laser beam concentrated at the light-condensing plane of the transparent medium is to be polarized perpendicular to a longitudinal direction of the aperture.

18. The near-field light-emitting element according to claim 1, wherein
a thickness of the metal body is smaller than a wavelength of the laser beam, and is sufficient to block the laser beam.

19. An optical head comprising:
a transparent medium having:
a plane of incidence into which a laser beam enters; and
a light-condensing plane on which the laser beam having entered the plane of incidence is concentrated; and
a metal body provided on the light-condensing plane of the transparent medium having:
a first surface contacting the light-condensing plane;
a second surface opposing the first surface; and
an aperture which is formed to penetrate through the first and second surfaces at a position where the laser beam is concentrated and which emits a near-field light obtained from the laser beam, wherein
the metal body is arranged apart from a center of the aperture by a predetermined distance to connect together the first surface and the second surface, and has a plasmon reflection plane that reflects toward the aperture a surface plasmon excited on the first and second surfaces by the laser beam concentrated at the aperture.

* * * * *